United States Patent [19]

Ng

[11] Patent Number: 4,980,700
[45] Date of Patent: Dec. 25, 1990

[54] LED PRINTHEAD WITH DROPLET FORMED MICRO-LENSLETS AND METHOD FOR PRODUCING SAME

[75] Inventor: Yee S. Ng, Fairport, N.Y.

[73] Assignee: Eastman Kodak Company, Rochester, N.Y.

[21] Appl. No.: 522,951

[22] Filed: May 14, 1990

[51] Int. Cl.$^5$ .................... G01D 15/14; B29D 11/00; B41J 2/45

[52] U.S. Cl. ................... 346/1.1; 346/107 R; 350/417

[58] Field of Search ............... 346/1.1, 107 R, 108, 346/160; 355/1; 350/320, 417

[56] References Cited

U.S. PATENT DOCUMENTS

| | | | |
|---|---|---|---|
| 4,678,311 | 7/1987 | Loce | 355/1 |
| 4,776,868 | 10/1988 | Trotter | 350/417 |
| 4,824,195 | 4/1989 | Khoe | 350/320 |

Primary Examiner—Bruce A. Reynolds
Assistant Examiner—Scott A. Rogers
Attorney, Agent, or Firm—Norman Rushefsky

[57] ABSTRACT

An LED printhead includes an optical mask overlying the LED's to balance light outputs therefrom. The transmission density of the mask is adjusted for each LED in accordance with its respective light output to adjust same so that the light outputs from all LED's are the same. The mask comprises a micro-lenslet incorporating a UV fadeable dye whose transmission density is adjusted with a UV laser or other light source while monitoring the light output from the respective LED. The transmission density of the mask may be adjusted by a UV light source provided on the printhead during periods of nonuse of the printhead or the printhead may be removed from the recording apparatus for adjustment. The micro-lenslet is formed by depositing a liquid polymeric binder in droplet form over the LED and having same set to form the lenslet in situ.

16 Claims, 2 Drawing Sheets

LED PRINTHEAD WITH DROPLET FORMED MICRO-LENSLETS AND METHOD FOR PRODUCING SAME

BACKGROUND OF THE INVENTION

1. Field of the Invention

This invention relates to non-impact printheads which are used for recording on photosensitive recording surfaces by electro-optical means such as light-emitting diodes (LED's) and other light sources. The invention further relates to a method for making such printheads to provide balanced light outputs by the recording elements.

2. Description Relative to the Prior Art

In the prior art as exemplified by U.S. application Ser. No. 07/375,154, an LED (light-emitting diode) printhead is disclosed wherein the problem of nonuniformity of light output from the LED's is recognized. Each printhead may include several thousand LED's arranged in a row. When the LED's are driven with the same levels of electrical current, some of the LED's are found to provide more light output than others, thereby providing nonuniformity between their respective exposures on the recording surface. To overcome this problem, the patent application discloses that a mask may be provided between the LED's and the recording surface. The mask comprises a layer containing a fadeable dye that has been exposed by an ultraviolet emitting-light source. The density of the portion of a mask opposite a respective LED varies with the brightness of that LED so that correspondingly more light is absorbed in masked portions opposite brighter LED's. Thus, uniformity in light output is achieved or at least improved. However, the use of the mask reduces the effective amount of light-impinging on the photosensitive recording surface from that LED.

It is an object, therefore, of the invention to provide for improved uniformity in LED printheads or the like without the noted disadvantages of the prior art.

SUMMARY OF THE INVENTION

In accordance with one aspect of the invention, the invention is directed to a non-impact printhead for recording, which comprises a plurality of recording elements for emitting light in a first spectrum in response to signals applied thereto for use in recording; and a lenslet over each recording element, the lenslet incorporating a dye that is sensitive to light in a second spectrum different than said first spectrum, said dye changing its transmittance to light of the first spectrum in response to exposure to light in said second spectrum, and wherein the transmittance of the lenslet over each recording element is adjusted to balance the light emitted from the recording elements for recording.

In accordance with another aspect of the invention, a method of forming a printhead that has enhanced light output for recording is provided by the steps of depositing a liquid droplet over each of a series of light-emitting recording elements; and allowing the droplets to set to form a lenslet over each recording element.

In accordance with another aspect of the invention, the invention is directed to a method of providing enhanced light output from recording elements; said method comprising the steps of forming a lenslet over each recording element incorporating a dye that is responsive to light in a first spectrum; sensing the light output of a recording element, the light output being in a second spectrum; and in response to said sensing modifying the transmittance of the lenslet for said recording element by using light of the first spectrum which is different from light of said second spectrum.

BRIEF DESCRIPTION OF THE DRAWING

Description of the preferred embodiments of the invention will be made with reference to the accompanying Figures in which.

DESCRIPTION OF THE PREFERRED EMBODIMENT

Because apparatus of the type described herein are well known, the present description will be directed in particular to elements forming part of, or cooperating more directly with, the present invention.

Figure 1:
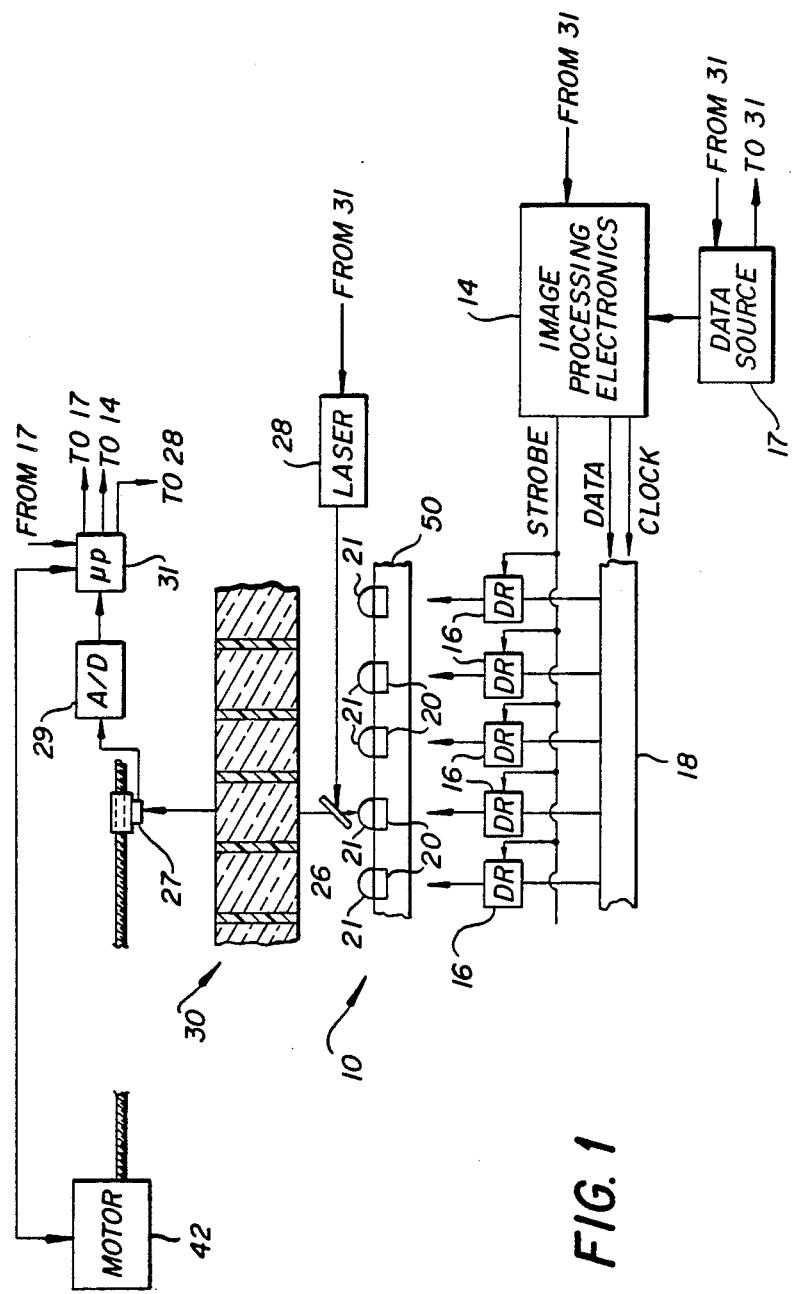
FIG. 1 is a schematic of one embodiment of an LED printhead made in accordance with the invention and illustrates a cross-section thereof of the portions dealing most directly with the invention.

The apparatus for the herein disclosed invention is typified by the diagram of FIG. 1: a linear array 10 of several thousand triggerable radiation sources 20; e.g. LED's, is illustrated. The LED's are formed on chip arrays 50 which are in turn mounted with electronic driver chips on an appropriate support as is well known. The LED chip arrays are positioned end to end so that a continuous row of LED's is formed. Optical means 30 for focusing the LED's for exposure onto a recording medium is also provided. In this regard, gradient index optical fiber devices such as Selfoc (trademark of Nippon Sheet Glass Co., Ltd.) arrays are highly suited. The LED's of the array 10 are triggered into operation by means of image processing electronics 14 that are responsive to image signal information from a data source 17 such as a computer of scanner 17. The image processing electronics, via a strobe signal, activates respective drivers 16 and the drivers provide current to the LED's when an image dot or pixel is to be recorded. Depending on the duration for which any given LED is turned on, the exposure effected by such LED is more or less made. Data for selecting the particular LED's to be turned on for a particular recording line of pixels is provided in digital form, i.e., digital bits of 1's and 0's that are stored for each line in registers 18 which incorporate serial-in parallel-out shift registers and latch registers for storing the data bits to allow the next line of data to be fed to the shift registers as the present line of data is being printed, see for example, U.S. Pat. No. 4,750,010. Where the recording medium is, say, photographic film the latent image formed line by line by selective exposure of said LED's may be subsequently developed by conventional means to form a visible image. Where the medium is an electrophotographic receptor, the LED's may be used to form an electrostatic image on a uniformly electrostatically charged photoconductor and this image developed using opaque toner particles and perhaps transferred to a copy sheet, see U.S. Pat. No. 3,850,517, the contents of which are incorporated herein by this reference.

Figure 4:
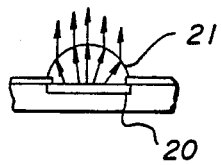
FIG. 4 is an enlargement of a portion of FIG. 1.

As may be noted in FIG. 1, a photosensitive device such as a charge-coupled device (CCD) 27 or photodiode, is positioned at the image focal plane of the gradient index lens to sense the light output from a single LED 20. This LED is enabled by a suitable signal from a microprocessor 31 to the image processing electronics 14. The signal may be in the form of data which selects only one LED to be on and all the others to be off. A partial mirror 26 is provided in the light path between LED 20 and CCD 27. A beam of light from a laser device 28 is simultaneously activated with the turning on of the LED. The light from the laser is in this preferred embodiment in the ultraviolet spectrum ($\leq 400$ $\mu$m). Light from the LED's may be in the red or infrared spectrum, say 650–720 $\mu$m. A spherical lenslet 21 is formed upon each LED. LED's are fabricated on wafers which are scribed and then arranged so that chip arrays are arranged in butted fashion so that a long row of LED's are formed on the printhead. Preferably, droplets of a polymeric dielectric binder incorporating a UV fadeable dye are deposited on the LED array after all butting and wiring are done. The surface tensions of the system will form a spherical lenslet as illustrated in FIG. 4. After setting of the lenslet at a suitable temperature the transmissivity of the lenslet is adjusted as will be described. One dye that has been found to be useful is fluorene (1,3-diphenyl-4-oxa-9-(2,4,6-trinitrophenyl)):

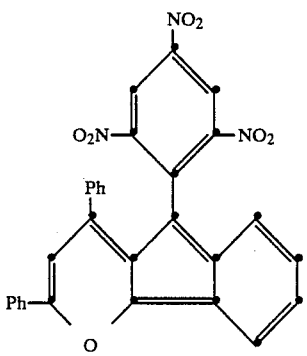

in a polyester binder such as, for example, poly(isopropylidene bisphenoxyethyl-co-ethylene terephthalate [50/50 ratio of the glycols]. However, other UV dies and binders will also be useful. Where the binder used is a dielectric, suitable openings are provided to allow wire bonds to be made to the contact pads of the LED's. These pads form a terminus for the electrical leads that are connected to each LED. Current from the drivers 16 can then be fed to these pads via the wire bonds.

In operation, light from the LED is sensed by the photosensor 27 and converted into a digital signal by A/D converter 29. The digital representation of this signal is then fed to the microprocessor 31. The microprocessor controls the laser 28 turning same on until light from the laser and reflected from mirror 26 bleaches or fades the dye such that the light level from the LED is at the appropriate level. A UV filter may be placed over the sensor 27 to block light from the laser from reaching this sensor. At this point the LED and the laser are turned off and the assembly incremented to be in position to operate upon the next LED. The assembly may be movable so as to position itself automatically at the correct position or a microscope may be provided to allow an operator to adjust the assembly manually. Automatic positioning may be accomplished by moving the assembly to the next LED and positioning same at the position where maximum intensity was noted. In lieu of mirror 26 the laser beam may be aimed directly at the LED and pass through a window in the printhead cover that is UV transparent or is openable such as by a slide device.

Description will now be provided with regard to apparatus for automatic adjustment of position of the assembly, i.e., the photosensor 27 and mirror 26. As the assembly is incremented over to the next LED, this next LED is turned on and samples of light output are measured by photosensor 27 while the photosensor is stepped in increments toward its new position. These samples are stored by the microprocessor and a point of maximum intensity determined relative to a position at which such maximum was recorded. The assembly is then incremented back to that position by operation of a signal to drive motor 42 which drives the assembly with a rod 33 having screw threads. The assembly is then driven back to that position. The advantage of automatic adjustment of position is that such an assembly and driver mechanism may be incorporated permanently on the printhead so that when assembled in a recording apparatus opposite a recording element, adjustments such as described herein may be made from time to time to control uniformity. A glass plate may be placed over the printhead to block undesired UV light produced by corona chargers when in an electrophotographic recorder, or from room light. The Selfoc lens and lens holder may perform this function, too. In lieu of adjustments on the recording apparatus itself, the printhead may be removed from the recording apparatus, returned to the factory from which it was originally adjusted for adjustment in accordance with the techniques described herein and returned back to the same or some other recording apparatus.

Figure 2:
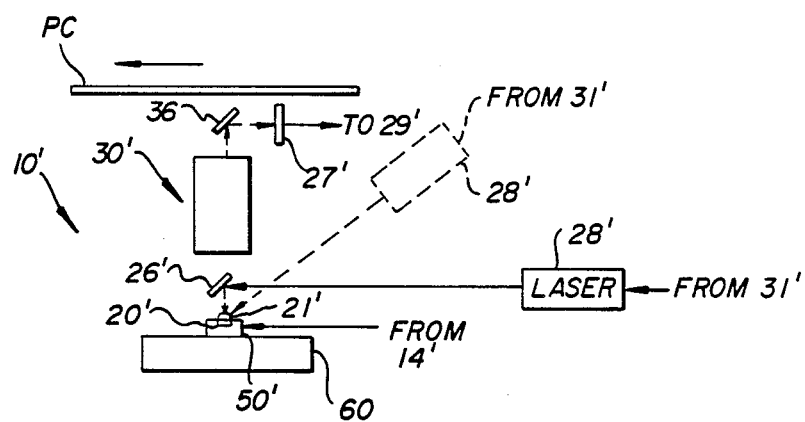
FIG. 2 is a schematic of a second embodiment of the invention showing an LED printhead in an elevational view as viewed from one end of the printhead.

With reference now to the embodiment of FIG. 2, similar elements to that shown and described with regard to FIG. 1 are noted with a prime ('). In this embodiment, the LED printhead is shown in a view from one end of the printhead. In this view, the LED's 20' are arranged in a single row that would be perpendicular to the plane of the figure. The LED's are formed in chip arrays 50' that are arranged end to end as is well known and supported on a suitable support 60. The lenslet 21' with a UV fadeable dye is formed in situ over each LED's 20'. A UV source such as a laser 28' impinges light by reflection from mirror 26' or directly without a mirror as noted in phantom also by laser 28'. Where the adjustments are to be made without removal from the recording apparatus, a second mirror 36 can be provided to reflect light from the LED to the CCD 27'. The CCD 27', mirrors 36 and 26' are coupled together and are indexable along the length of the printhead by suitable means similar to that shown and described for the embodiment of FIG. 1. Where the printhead includes the capability of adjustment without removal from the recording apparatus, the apparatus recording surface such as photographic film or photoconductor (PC) will be located as shown. CCD 27' will be located at a position optically equivalent to the image plane which is that plane in which the surface of the photoconductor (PC) is located in an electrophotographic recording apparatus.

Figure 3:
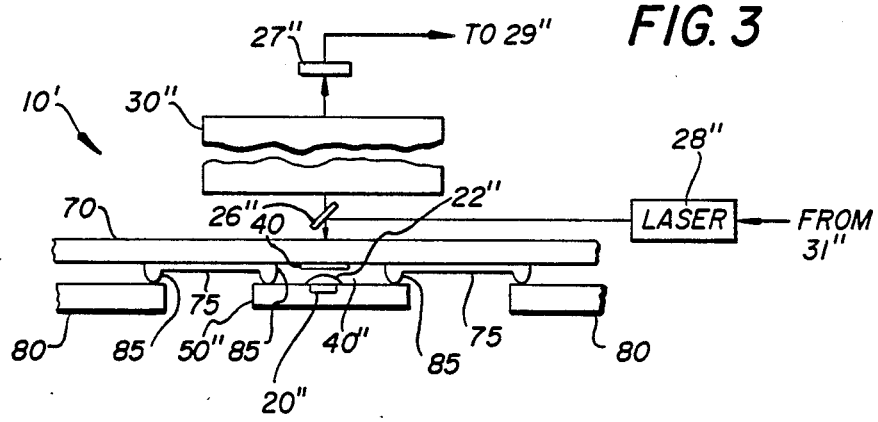
FIG. 3 is a schematic of a third embodiment of the invention showing an LED printhead in an elevational view also as viewed from one end of the printhead.

With reference now to the embodiment of FIG. 3, similar structures to that shown in FIG. 1 are indicated with a double prime (Δ). In addition, electrical apparatus illustrated and described with regard to FIG. 1 will also be present in the embodiments of FIGS. 2 and 3. In this embodiment, the LED array chips 50Δ are mounted upon a glass support 70 in a "flip-chip" manner. The glass support 70 has coated on its undersurface the metal traces or leads 75 suited for interconnecting the electronic driver chips 80 which incorporate the registers 18 and driver circuitry for driving the LED's. The driver chips 80 and LED array chips are mounted to the glass support via microbumps 85 of metal which are fabricated upon the traces or the chips. More details regarding such a structure may be noted in U.S. Pat. No. 4,749,120, the contents of which are incorporated by this reference. Also coated or fabricated on the glass support is a strip 40 of the polymeric binder incorporating a UV fadeable dye. The dye is above the LED's 20" and the spherical lenslets 22" and is selectively faded in accordance with light from UV laser 28" provided in response to measurement of light from CCD sensor 27". In the embodiment just described, separation of the LED's from the mask layer reduces the thermal effect that heat from the LED's may produce upon the dye. In this example, the polymeric binder forming the lenslet does not incorporate the dye. Other ways to reduce thermal effects may be to provide air cooling of the printhead or reduce LED brightness by using more sensitive recording elements.

As may be noted in FIG. 4, enhanced light output is provided by micro-lenslets by modifying the usual Lambertian light output of the LED's into a more forward focussed source. More effective light collection is thus provided resulting in improved irradiance on the film plane.

While the invention has been described with particular reference to preferred embodiments thereof, it will be understood that variations and modifications can be effected within the spirit and scope of the invention.

We claim:

1. A non-impact printhead for recording, which comprises:
    a plurality of recording elements for emitting light in a first spectrum in response to signals applied thereto for use in recording;
    a lenslet over each recording element, the lenslet incorporating a dye that is sensitive to light in a second spectrum different than said first spectrum, said dye changing its transmittance to light of the first spectrum in response to exposure to light in said second spectrum to form a mask, and wherein the transmittance of the mask over such recording element is adjusted to balance the light emitted from the recording elements for recording
    means for sensing light emitted from a recording element;
    means for adjusting the transmittance of the mask over the recording elements.

2. The printhead of claim 1 and wherein the recording elements are light-emitting diodes.

3. A method of providing uniformity in the light outputs in recording elements; said method comprising the steps of:
    forming a lenslet over each recording element, the lenslet incorporating a dye that is responsive to light in a first spectrum,
    sensing the light output of a recording element, the light output being in a second spectrum; and in response to said sensing modifying the transmittance of the lenslet for said recording element by using light of a first spectrum different from said second spectrum.

4. The method of claim 3 and wherein electrical signals are generated in response to the sensing of the light output from the recording element and the transmittance is adjusted by exposure of a dye within the lenslet by light from another source.

5. The method of claim 4 and wherein the recording elements are light-emitting diodes.

6. The method of claim 5 and wherein the transmittance of lenslets corresponding to respective light-emitting diodes are adjusted to balance the light outputs from the combination of the light-emitting diodes and their respective lenslets.

7. The method of claim 5 and wherein the transmittance of lenslets corresponding to respective recording elements are adjusted to balance the light outputs from the combination of the recording elements and their respective lenslets.

8. The method of claim 3 and wherein the transmittance of lenslets corresponding to respective recording elements are adjusted to balance the light outputs from the combination of the recording elements and their respective lenslets.

9. The method of claim 3 and wherein the light in sensed after passing through a lens that is used in printing by recording exposures of said recording elements upon a photosensitive material.

10. A non-impact printhead for recording, which comprises:
    a plurality of light-emitting recording elements formed upon a chip array;
    a transparent support having a surface upon which the chip array is supported with the recording elements facing said surface so that light from the elements impinge upon said surface;
    mask means between said recording elements and said surface, said mask means providing selective transmittance from said recording elements so as to balance relative to each other the light outputs of the recording elements that will impinge upon a recording medium and
    a micro-lenslet over each recording element between said mask and recording element
    means for sensing light emitted from the recording element;
    means for adjusting the transmittance of the mask over the recording elements.

11. The printhead of claim 10 and wherein the mask is mounted upon said surface the support and is spaced from the recording elements.

12. The printhead of claim 10 and wherein the mask is mounted upon said surface, said recording elements emitting light in a first spectrum in response to signals applied thereto for use in recording;
    the mask incorporating a dye that is sensitive to light in a second spectrum different than said first spectrum, said dye changing its transmittance to light of the first spectrum in response to exposure to light in said second spectrum, and wherein the transmittances of the mask means over such recording elements are adjusted to balance the light emitted from the recording elements for recording.

13. The printhead of claim 10 and wherein the recording elements are light-emitting diodes.

14. The printhead of claim 12 and wherein the recording elements are light-emitting diodes.

15. A method of forming a printhead that has enhanced light output for recording, comprising the steps of:

depositing a liquid droplet over each of a series of light-emitting recording elements; and allowing the droplets to set to form a lenslet over each recording element.

16. The method of claim 15 and wherein the droplet incorporates a dye that is fadeable in response to light of a first spectrum and the recording elements emit light of a second spectrum.

* * * * *